United States Patent
Ko et al.

(10) Patent No.: US 9,893,582 B2
(45) Date of Patent: Feb. 13, 2018

(54) MOTOR STATOR

(71) Applicant: ScienBizip Consulting (ShenZhen) Co., Ltd., Shenzhen (CN)

(72) Inventors: Jin-Yu Ko, New Taipei (TW); Po-Chang Hung, New Taipei (TW); Shih-Hsin Hsu, New Taipei (TW)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 404 days.

(21) Appl. No.: 14/620,728

(22) Filed: Feb. 12, 2015

(65) Prior Publication Data

US 2015/0249369 A1    Sep. 3, 2015

(30) Foreign Application Priority Data

Mar. 3, 2014 (TW) .............................. 103107104 A

(51) Int. Cl.
*H02K 3/04* (2006.01)
*H02K 3/00* (2006.01)
*H02K 3/12* (2006.01)
*H02K 3/28* (2006.01)

(52) U.S. Cl.
CPC ................. *H02K 3/12* (2013.01); *H02K 3/28* (2013.01)

(58) Field of Classification Search
CPC .................................. H02K 3/28; H02K 15/00
USPC ................ 310/179, 198, 201, 202, 203, 210
See application file for complete search history.

(56) References Cited

U.S. PATENT DOCUMENTS

| | | | | |
|---|---|---|---|---|
| 6,201,332 B1 * | 3/2001 | Umeda | ..................... | H02K 3/12 310/179 |
| 2002/0117928 A1 * | 8/2002 | Yasuhara | ................. | H02K 3/12 310/201 |
| 2003/0137207 A1 * | 7/2003 | Tamura | ............. | H02K 15/0056 310/184 |

FOREIGN PATENT DOCUMENTS

WO    2011069243 A1    6/2011

\* cited by examiner

*Primary Examiner* — Jose Gonzalez Quinones
(74) *Attorney, Agent, or Firm* — ScienBiziP, P.C.

(57) ABSTRACT

A stator includes a winding core and a plurality of winding mechanisms. A plurality of winding grooves are defined on an inner surface of the winding core. Each of the winding mechanisms includes a first conductive wire and a second conductive wire. The first conductive wire includes a first curve portion, a first pin, and a second pin. The second conductive wire includes a second curve portion, a third pin, and a forth pin. The first conductive wire and the second conductive wire can be alternately connected together one by one via a first pin, a second pin, a third pin, and a forth pin to form two coils.

19 Claims, 8 Drawing Sheets

MOTOR STATOR

FIELD

The subject matter herein generally relates to a stator and a winding mechanism thereof.

BACKGROUND

A stator commonly includes a winding core and a plurality of winding coils, and the winding core can define a plurality of winding grooves configured to receive the winding coils. The traditional winding methods are a lap winding method and a wave-shape winding method. The lap winding method can reduce the power density of a motor due to increasing a length of an end of each of the winding coils. The wave-shape winding method can reduce an output torque of a motor.

BRIEF DESCRIPTION OF THE DRAWINGS

Implementations of the present technology will now be described, by way of example only, with reference to the attached figures.

DETAILED DESCRIPTION

Figure 1:
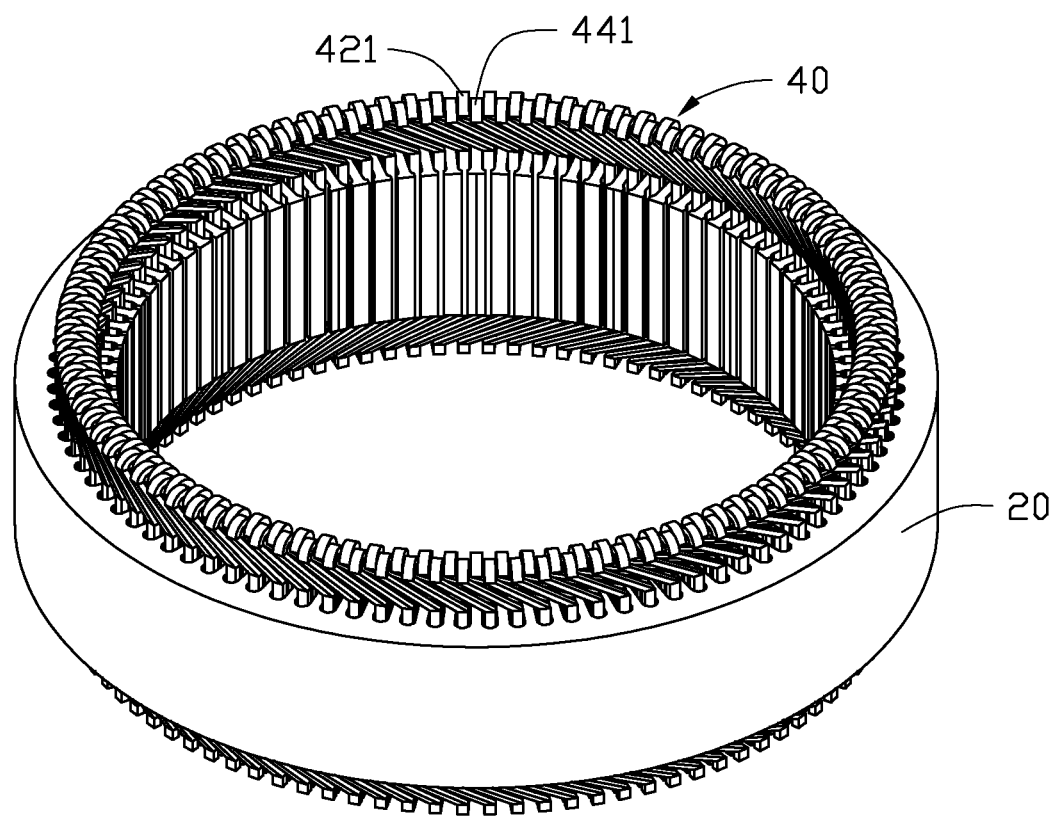
FIG. 1 is an isometric view of an embodiment of a stator.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "outside" refers to a region that is beyond the outermost confines of a physical object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a stator.

FIG. 1 illustrates an embodiment of a stator 100. The stator 100 can include a winding core 20 and a plurality of winding mechanisms 40.

Figure 2:
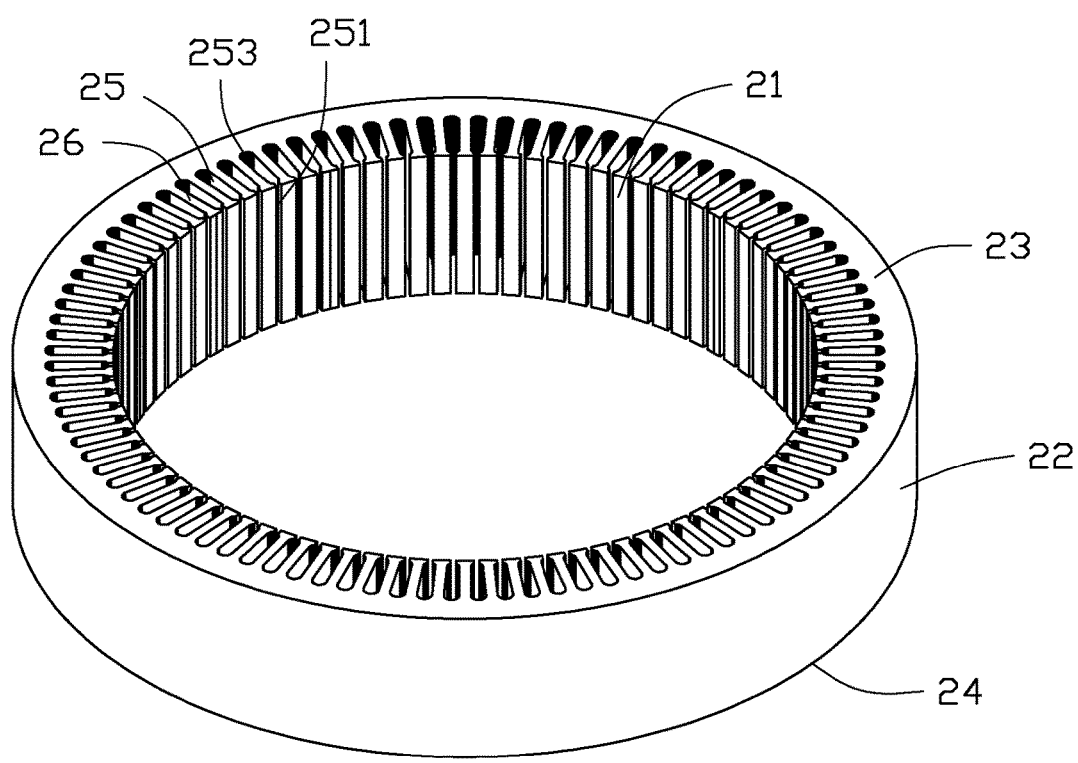
FIG. 2 is an isometric view of a winding core of the stator of FIG. 1, the winding core has a plurality of winding grooves arranged in the circumferential direction thereof.
Figure 3:
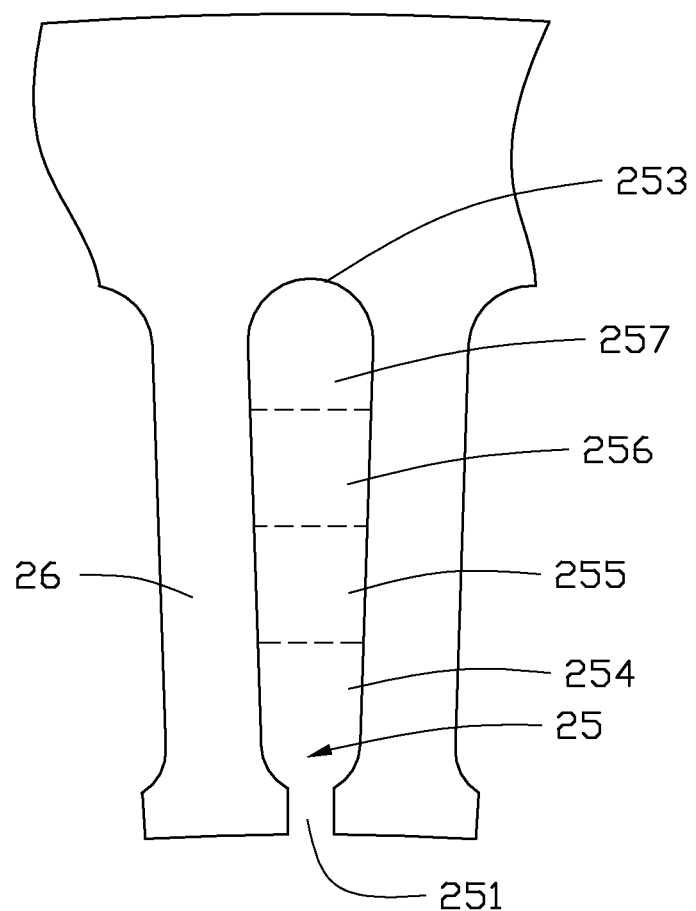
FIG. 3 is an enlarged top view of a winding groove of the stator of FIG. 2.
Figure 4:
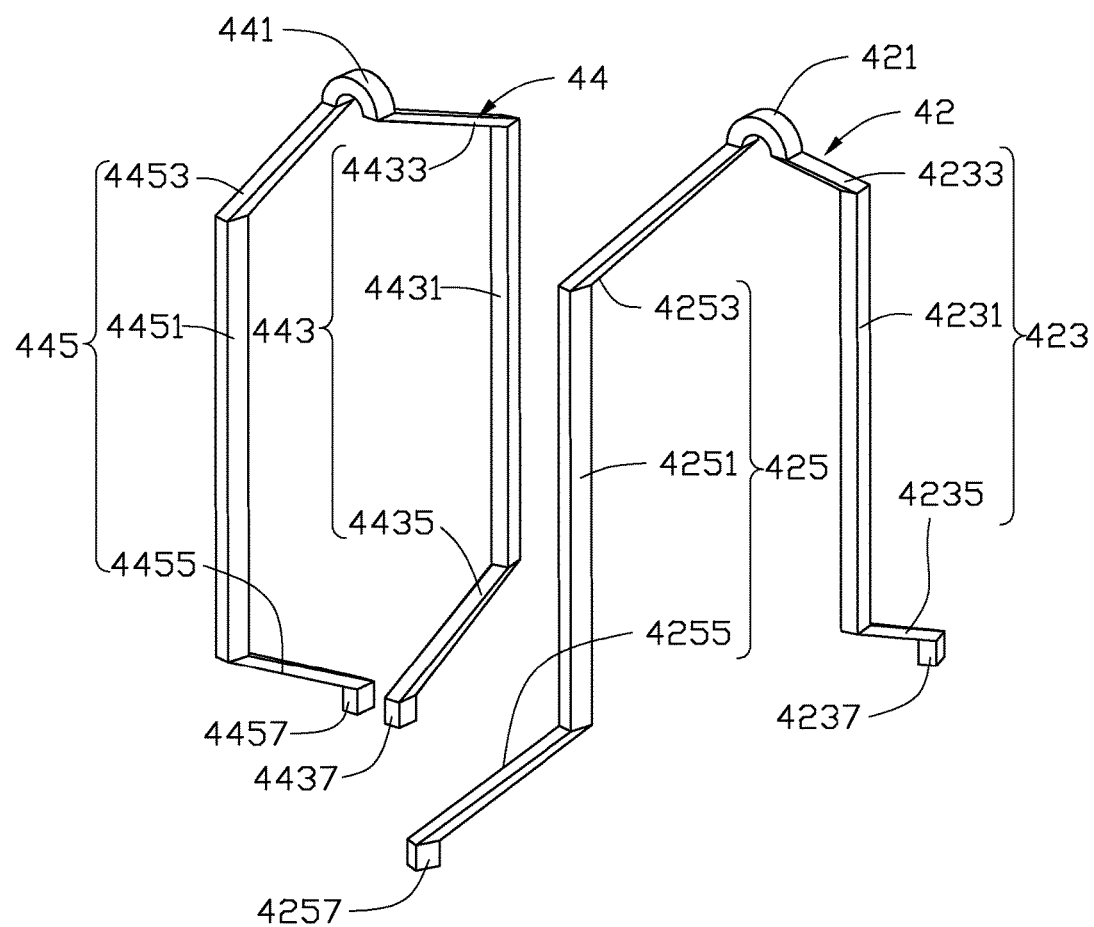
FIG. 4 is an isometric view of one winding mechanism of the stator of FIG. 1.
Figure 5:
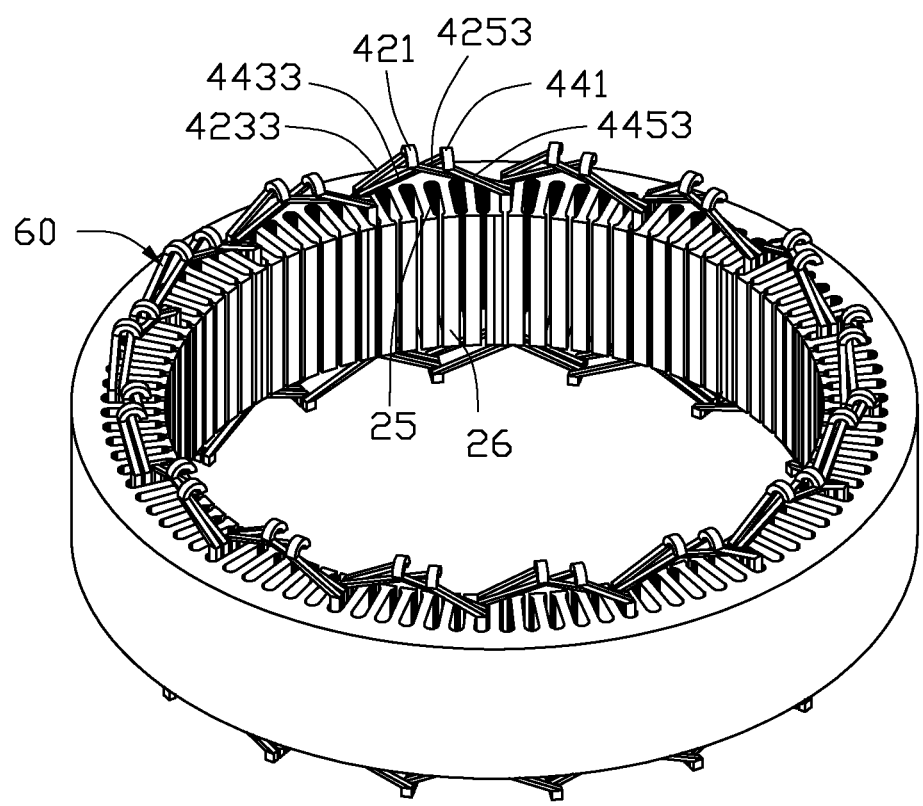
FIG. 5 is a partial, isometric view of the stator of FIG. 1.

FIG. 2 to FIG. 4 illustrate that the winding core 20 can be hollow cylindrical. The winding core 20 can include an inner surface 21, an outside surface 22 opposite to the inner surface 21, an upper surface 23, and a lower surface 24 opposite to the upper surface 23. The winding core 20 further includes a plurality of winding grooves 25 arranged on the inner surface 21 of the circumferential. Each of the winding grooves 25 can pass through the upper surface 23 and the lower surface 24. Each of the winding grooves 25 can include an open portion 251 and a bottom portion 253 communicating with the open portion 251. The open portion 251 can be positioned on the inner surface 21. The bottom portion 253 can be adjacent to the outside surface 22. Each of the winding grooves 25 can be divided into a first portion 254, a second portion 255, a third portion 256, and a fourth portion 257 along an orientation from the open portion 251 to the bottom portion 253. The space of the first portion 254, the second portion 255, the third portion 256, and the fourth portion 257 can substantially be same size to receive a plurality of conductive wires. The adjacent two winding grooves 25 can form a winding rod 26. The number of the winding grooves 25, the winding rods 26 and the winding mechanisms 40 can be ninety-six.

Each winding core 20 can include a first conductive wire 42 and a second conductive wire 44 received in the winding grooves 25. The first conductive wire 42 and the second conductive wire 44 can be coiled round the winding rods 26. The first conductive wire 42 can substantially be an asymmetrical U-shaped. The first conductive wire 42 can include a first curve portion 421, a first pin 423 connected to an end of the first curve portion 421, and a second pin 425 connected to an opposite end of the first curve portion 421. The first pin 423 can include a first main body 4231, a first connecting portion 4233 positioned on an end of the first main body 4231, and a first extending portion 4235 positioned on an opposite end of the first main body 4231. The first main body 4231 can be received in the one winding groove 25. The first connecting portion 4233 can be connected to the first curve portion 421, and an angle of the first connecting portion 4233 and the first main body 4231 can be a set obtuse angle. The first extending portion 4235 can be formed located away from the first connecting portion 4233. An angle of the first extending portion 4235 and the first main body 4231 can be a different set obtuse angle. A first weld portion 4237 can be defined extending from an end of the first extending portion 4235. The angle of the first connecting portion 4233 and the first main body 4231 can be equal or unequal to the angle of the first extending portion 4235 and the first main body 4231.

The second pin 425 can include a second main body 4251, a second connecting portion 4253 positioned on an end of the second main body 4251, and a second extending portion 4255 positioned on an opposite end of the second main body 4251. The second connecting portion 4253 and the first connecting portion 4233 can be positioned on the different planes (not labeled). The second extending portion 4255 can be located away from the second connecting portion 4253 and the first extending portion 4235. A second weld portion 4257 can be formed extending from an end of the second extending portion 4255. The second main body 4251 can be parallel to the first main body 4231. The second connecting portion 4253 can be connected to the first curve portion 421, and an angle of the second connecting portion 4253 and the second main body 4251 can be equal to the angle of the first connecting portion 4233 and the first main body 4231. An angle of the second extending portion 4255 and the second main body 4251 can be equal to the angle of the first extending portion 4235 and the first main body 4231. Therefore, the angle of the second connecting portion 4253 and the second main body 4251 can be equal or unequal to the angle of the second extending portion 4255 and the second main body 4251.

A length of the second main body 4251 of the second pin 425 can be equal to a length of the first main body 4231 of the first pin 423. A length of the second connecting portion 4253 of the second pin 425 can be longer than a length of the first connecting portion 4233 of the first pin 423. A length of the second extending portion 4255 of the second pin 425 can be equal to a length of the first extending portion 4235 of the first pin 423. A length of the second weld portion 4257 of the second pin 425 can be equal to a length of the first weld portion 4237 of the first pin 423. Therefore, a length of the second pin 425 can be longer than a length of the first pin 423. In addition, the length of the second pin 425 can be shorter than the length of the first pin 423, and there is no interference the first conductive wire 42 forming the asymmetrical U-shape.

The structure of the second conductive wire 44 can substantially be same as the structure of the first conductive wire 42. The second conductive wire 44 can include a second curve portion 441, a third pin 443 connected to an end of the second curve portion 441, and a fourth pin 445 connected to an opposite end of the second curve portion 441. A length and a radian of the curve portion 441 can be equal to a length and a radian of the first curve portion 421. The third pin 443 and the fourth pin 445 can be bent. The third pin 443 can include a third main body 4431, a third connecting portion 4433 positioned on an end of the third main body 4431, a third extending portion 4435 positioned on an opposite end of the third main body 4431, and a third weld portion 4437 connected to the third extending portion 4435. The third connecting portion 4433 and the third extending portion 4435 can be extended from the same side of the third main body 4431. An angle of the third connecting portion 4433 and the third main body 4431 can be a set obtuse angle. An angle of the third extending portion 4435 and the third main body 4431 can be can be a different set obtuse angle.

The fourth pin 445 can include a fourth main body 4451, a fourth connecting portion 4453 positioned on an end of the fourth main body 4451, a fourth extending portion 4455 positioned on an opposite end of the fourth main body 4451, and a fourth weld portion 4457 connected to the third extending portion 4435. The fourth connecting portion 4453 and the fourth extending portion 4455 can be extended from the same side of the fourth main body 4451. An angle of the fourth connecting portion 4453 and the fourth main body 4451 can be equal to the angle of the third connecting portion 4433 and the third main body 4431. An angle of the fourth extending portion 4455 and the fourth main body 4451 can be equal to the angle of the third extending portion 4435 and the third main body 4431. The fourth connecting portion 4453 and the third connecting portion 4433 can be positioned on the different planes (not shown). The fourth weld portion 4457 can be adjacent to the third weld portion 4437.

A length of the third main body 4431 and the fourth main body 4451 of the second conductive wire 42 can be equal to the length of the first main body 4231 of the first conductive wire 42. A length of the third extending portion 4435 and the fourth extending portion 4455 of the second conductive wire 42 can be equal to the length of the first extending portion 4235 of the first conductive wire 42. A length of the third weld portion 4437 and the fourth weld portion 4457 of the second conductive wire 42 can be equal to the length of the first weld portion 4237 of the first conductive wire 42. A length of the third connecting portion 4433 can be shorter than the length of the second connecting portion 4253. A length of the fourth connecting portion 4435 can be longer than the length of the first connecting portion 4233. However, a length of the second conductive wire 44 can be equal to a length of the first conductive wire 42.

The angle of the third connecting portion 4433 and the third main body 4431 can be equal to the angle of first connecting portion 4233 and the first main body 4231. The angle of the third extending portion 4435 and the third main body 4431 can be equal to the angle of the first extending portion 4235 and the first main body 4231. The angle of the third extending portion 4435 and the fourth main body 4451 and an angle of the fourth connecting portion 4453 and the fourth main body 4451 can be equal to the angle of the first extending portion 4235 and the first main body 4231.

Figure 6:
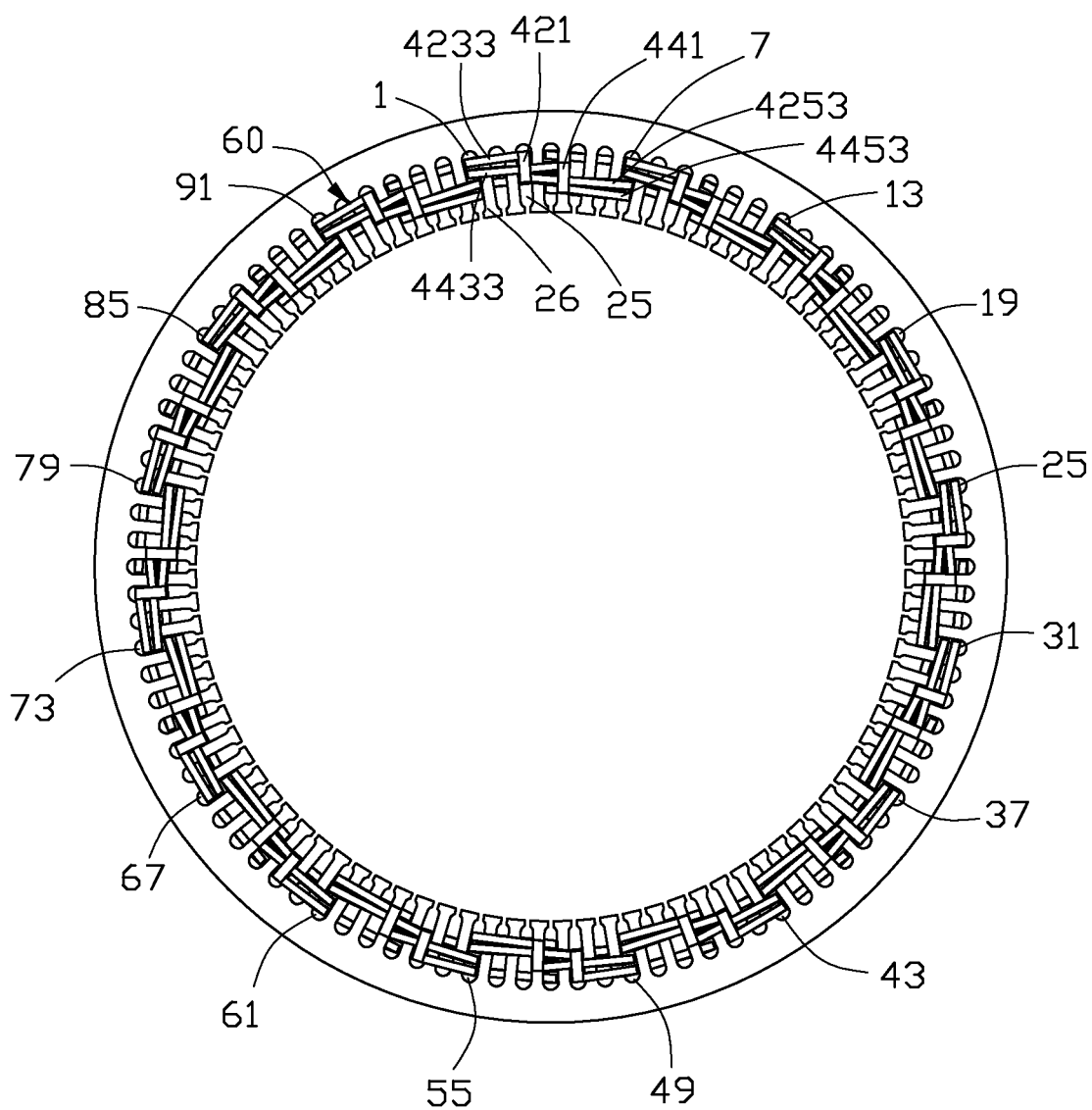
FIG. 6 is a top view of the stator of FIG. 5.
Figure 7:
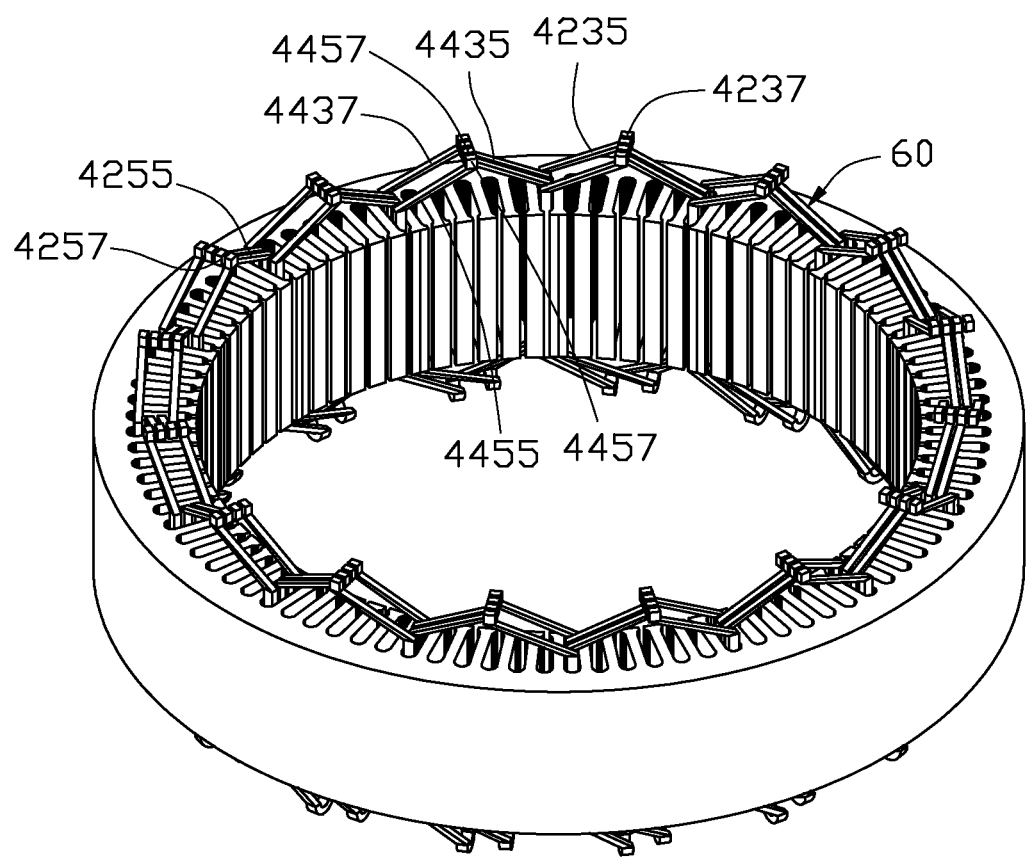
FIG. 7 is a partial, isometric view of the stator of FIG. 1 viewed from another aspect.
Figure 8:
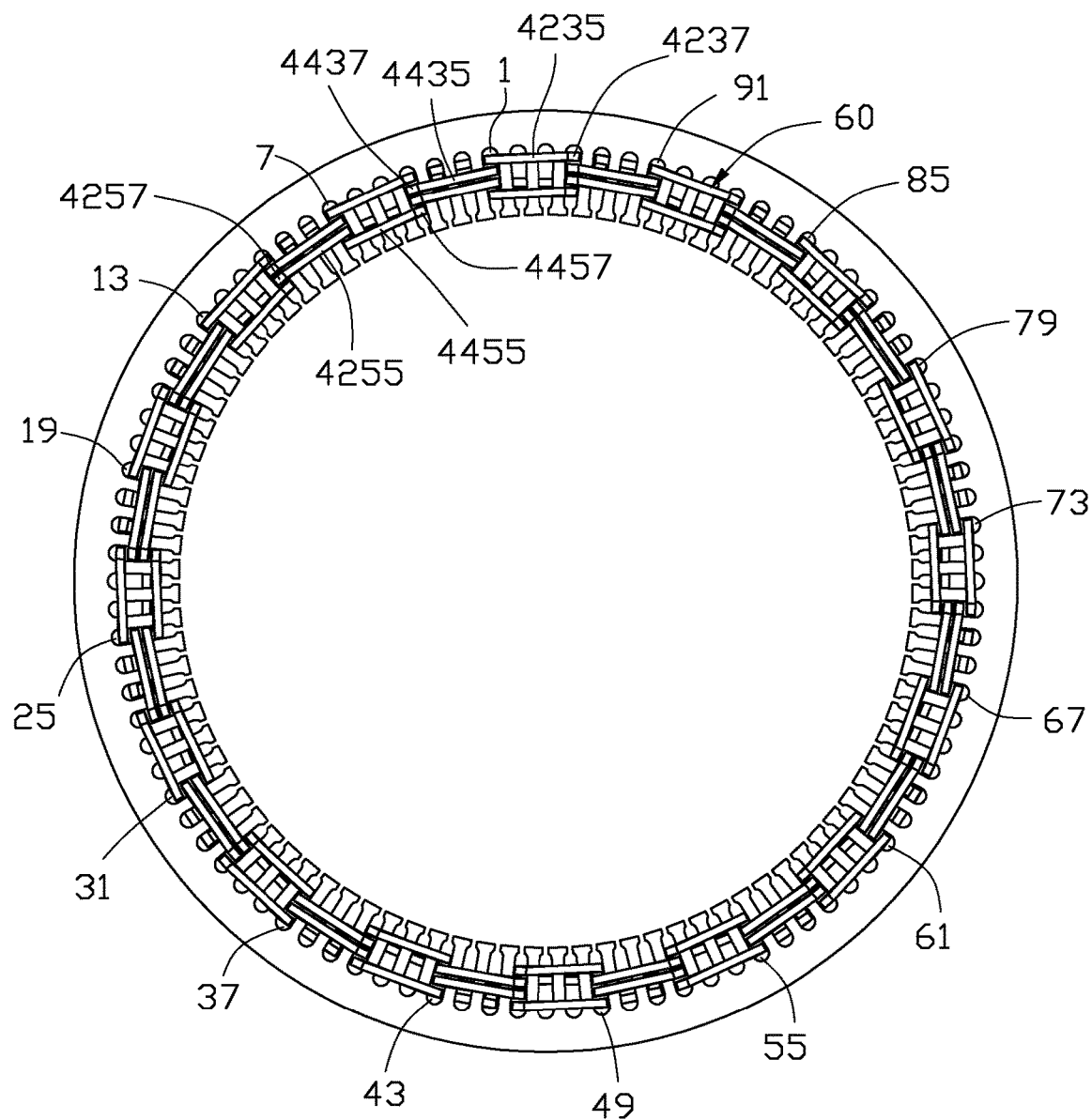
FIG. 8 is a top view of the stator of FIG. 7.

FIG. 6 to FIG. 8 illustrate that a plurality of sequence numbers of the winding grooves 25 can be labeled such as 1, 7, 13, 19, 25, 31, 37, 43, 49, 55, 61, 67, 73, 79, 85, 91. For example, the sequence numbers of 7 can indicate a seventh winding groove 25.

FIG. 3 to FIG. 8 illustrate when in assembly, the first pin 423 of the first conductive wire 42 of one winding mechanism 40 can be inserted into the fourth portion 257 of the first winding groove 25. The first main body 4231 of the first pin 423 can be received in the fourth portion 257. The first connecting portion 4233 can be positioned on the upper surface 23, and the first curve portion 421 can be positioned upon the third winding groove 25 and cover the second portion 255 to the fourth portion 257. The second pin 425 can be inserted into the second portion 255 of the seventh winding groove 25. The second connecting portion 4253 can stretch across the four winding rods 26, and the second main body 4251 can be received in the second portion 255 of the seventh winding groove 25. The third pin 443 of the second conductive wire 44 can be inserted into the third portion 256 of the first winding groove 25. The third connecting portion 4433 can be positioned on the upper surface 23 and can be located below the first curve portion 421 of the first pin 42. The second curve portion 441 of the second conductive wire 44 can be located upon the one winding rod 26 and the first connecting portion 4253. Finally, the fourth pin 445 can be inserted into the first portion 254 of the seventh winding groove 25. The fourth connecting portion 4453 can stretch across two winding rods 26, and the fourth main body 4451 can be received in the first portion 254 of the seventh winding groove 25.

The first extending portion 4235 of the first pin 423 can extend out of the lower surface 24 of the winding core 20 and stretch across three winding rods 26, and the first weld portion 4237 can be located below the fourth portion 257 of the 94th winding groove 25. The second extending portion 4257 of the second pin 425 can stretch across three winding rods 26, and the second weld portion 4257 can be located below the second portion 255 of the tenth winding groove 25. The third extending portion 4435 of the third pin 443 can stretch across three winding rods 26, and the third weld portion 4437 can be located below the third portion 256 of the fourth winding groove 25. The fourth extending portion 4455 of the fourth pin 445 can stretch across three winding rods 26, and the fourth weld portion 4457 can be located below the first portion 254 of the fourth winding groove 25.

According to the way described above, the other winding mechanisms 40 can be respectively inserted into the winding core 20. For example, the first pin 423 of the first conductive wire 42 of a second winding mechanism 40 can be inserted into the fourth portion 257 of the fourth winding groove 25, and the first weld portion 4237 can be located below the fourth portion 257 of the fourth winding groove 25. The second pin 425 can be inserted into the second portion 255 of the thirteenth winding groove 25, and the second weld portion 4257 can be located below the second portion 255 of the sixteenth winding groove 25. The third pin 443 of the second conductive wire 44 of a second winding mechanism 40 can be inserted into the third portion 256 of the seventh winding groove 25, and the third weld portion 4437 can be located below the third portion 256 of the tenth winding groove 25. The fourth pin 445 can be inserted into the first portion 254 of the thirteenth winding groove 25, and the fourth weld portion 4457 can be located below the first portion 254 of the tenth winding groove 25.

The first pin 423 of the first conductive wire 42 of a third winding mechanism 40 can be inserted into the fourth portion 257 of the thirteenth winding groove 25, and the first weld portion 4237 can be located below the fourth portion 257 of the tenth winding groove 25. The second pin 425 can be inserted into the second portion 255 of the nineteenth winding groove 25, and the second weld portion 4257 can be located below the second portion 255 of the 22th winding groove 25. The third pin 443 of the second conductive wire 44 of a second winding mechanism 40 can be inserted into the third portion 256 of the thirteenth winding groove 25, and the third weld portion 4437 can be located below the third portion 256 of the sixteenth winding groove 25. The fourth pin 445 can be inserted into the first portion 254 of the nineteenth winding groove 25, and the fourth weld portion 4457 can be located below the first portion 254 of the sixteenth winding groove 25.

The second weld portion 4257 of the first conductive wire 42 of the first winding mechanism 40 can be welded to the fourth weld portion 4457 of the second conductive wire 44 of the third winding mechanism 40, and the first conductive wire 42 of the first winding mechanism 40 can be electrically connected to the second conductive wire 44 of the third winding mechanism 40. The third weld portion 4437 of the second conductive wire 44 of the second winding mechanism 40 can be welded to the first weld portion 4237 of the first conductive wire 42 of the third winding mechanism 40. Therefore, the second conductive wire 44 of the second winding mechanism 40 can be electrically connected to the first conductive wire 42 of the third winding mechanism 40. As described above, the first conductive wire 42 and the second conductive wire 44 of the other winding mechanisms 40 can be alternately connected together in turn, and two coils 60 can be formed. The coils 60 can extend along a peripheral direction of the stator 100 to avoid an output torque loss of a motor (not shown).

In the other embodiments, the number of the winding rods 60 stretched by the first conductive wire 42 and the second conductive 44 can be determined according to actual needs. The first weld portion 4237, the second weld portion 4257, the third weld portion 4437, and the fourth weld portion 4457 can be removed. The first conductive wire 42 can be directly connected to the second conductive wire 44 by the first extending portion 4235, the second extending portion 4255, the third extending portion 4435, and the fourth extending portion 4455.

As described above, the first conductive wire 42 and the second conductive wire 44 can be asymmetrical U-shaped, and the first curve portion 421 of the first conductive wire 42 can be located upon one corresponding winding groove 25. The second curve portion 441 of the second conductive wire 44 can be located upon one corresponding winding rod 26. The first conductive wire 42 and the second conductive wire 44 can be alternately connected together one by one to avoid an overlap of the first curve portion 421 and the second curve portion 441. Therefore, a through loss from the copper of the coils 60 can be reduced. In addition, the coils 60 can extend along the peripheral direction of the stator 100 to improve the output torque of a motor (not shown).

The embodiments shown and described above are only examples. Many details are often found in the art such as the other features of a stator. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including matters of shape, size and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A motor stator comprising:
   a hollow cylindrical winding core comprising an inner surface; and
   a plurality of winding mechanisms;
   wherein a plurality of winding grooves are defined on the inner surface along a circumferential of the winding core, and each adjacent two of the plurality of winding grooves form a winding rod;
   wherein each of the plurality of winding mechanisms comprises a first conductive wire and a second conductive wire;
   wherein the first conductive wire comprises a first curve portion, a first pin connected to an end of the first curve portion, and a second pin connected to an opposite end of the first curve portion;
   wherein the second conductive wire comprises a second curve portion, a third pin connected to an end of the second curve portion, and a fourth pin connected to an opposite end of the second curve portion;
   wherein a length and a radian of the second curve portion are equal to a length and a radian of the first curve portion;
   wherein the first pin comprises a first main body, a first connecting portion positioned on an end of the first main body, and a first extending portion positioned on an opposite end of the first main body;
   wherein the second pin comprises a second main body, a second connecting portion positioned on an end of the second main body, and a second extending portion positioned on an opposite end of the second main body, the second connecting portion and the first connecting portion are positioned on the different planes, and the second extending portion is located away from the second connecting portion and the first extending portion;

wherein the third pin comprises a third main body, a third connecting portion positioned on an end of the third main body, a third extending portion positioned on an opposite end of the third main body;

wherein the fourth pin comprises a fourth main body, a fourth connecting portion positioned on an end of the fourth main body, a fourth extending portion positioned on an opposite end of the fourth main body, the fourth connecting portion and the third connecting portion is positioned on the different planes, the fourth extending portion is adjacent to the third extending portion;

wherein each of the plurality of winding grooves receives the fourth main body, the second main body, the third main body, and the first main body in turn, the first curve portion of each the first conductive wires is located upon corresponding one of the plurality of winding groove, and the second curve portion of each the second conductive wires is located upon one corresponding winding rod; and wherein each of the fourth pins is electrically connected to each of the second pins in turn, each of the third pins is electrically connected to each of the first pins in turn, and a plurality of coils is formed via the interconnecting winding mechanisms.

2. The motor stator as claimed in claim 1, wherein the first main body is parallel to the second main body, and the third main body is parallel to the fourth main body.

3. The motor stator as claimed in claim 1, wherein a length of the first main body is same as that of the second main body, the third main body, and the fourth main body.

4. The motor stator as claimed in claim 1, wherein a length of the first extending portion is same as that of the second extending portion, the third extending portion, and the fourth extending portion.

5. The motor stator as claimed in claim 1, wherein a length of the first connecting portion, the second connecting portion, the third connecting portion, and the fourth connecting portion is different.

6. The motor stator as claimed in claim 1, wherein a length of the first conductive wire is equal to a length of the second conductive wire.

7. The motor stator as claimed in claim 1, wherein an angle of the first connecting portion and the first main body, an angle of the second connecting portion and the second main body, an angle of the third connecting portion and the third main body, and an angle of the fourth connecting portion and the fourth main body are all a set obtuse angle.

8. The motor stator as claimed in claim 7, wherein an angle of the first extending portion and the first main body, an angle of the second extending portion and the second main body, an angle of the third extending portion and the third main body, and an angle of the fourth extending portion and the fourth main body are all a different set obtuse angle.

9. The motor stator as claimed in claim 8, wherein the set obtuse angle is equal to the different set obtuse angle.

10. The motor stator as claimed in claim 1, wherein the winding core further comprises an outside surface opposite to the inner surface, an upper surface, and a lower surface opposite to the upper surface, each of the plurality of winding grooves passes through the upper surface and the lower surface.

11. The motor stator as claimed in claim 1, wherein each of the plurality of winding grooves comprises an open portion and a bottom portion communicating with the open portion, the open portion is positioned on the inner surface, and the bottom portion is adjacent to the outside surface.

12. The motor stator as claimed in claim 1, wherein each of the plurality of winding grooves is divided into a first portion, a second portion, a third portion, and a fourth portion along an orientation from the open portion to the bottom portion.

13. The motor stator as claimed in claim 1, wherein the fourth main body, the second main body, the third main body, and the first main body are respectively received in the first portion, a second portion, a third portion, and a fourth portion in turn.

14. The motor stator as claimed in claim 1, wherein a first weld portion is formed on an end of the first extending portion, a second weld portion is formed on an end of the second extending portion, a third weld portion is formed on an end of the third extending portion, and a fourth weld portion is formed on an end of the fourth extending portion.

15. The motor stator as claimed in claim 1, wherein the number of the plurality of winding grooves is ninety-six.

16. The motor stator as claimed in claim 1, wherein the first conductive wires and the second conductive wires are alternately connected together in turn to form two coils.

17. A winding mechanism comprising:
a first conductive wire comprising a first curve portion, a first pin connected to an end of the first curve portion, and a second pin connected to an opposite end of the first curve portion; and
a second conductive wire comprising a second curve portion, a third pin connected to an end of the second curve portion, and a fourth pin connected to an opposite end of the second curve portion;
wherein a length and a radian of the second curve portion are equal to a length and a radian of the first curve portion;
wherein the first pin comprises a first main body, a first connecting portion positioned on an end of the first main body, and a first extending portion positioned on an opposite end of the first main body;
wherein the second pin comprises a second main body, a second connecting portion positioned on an end of the second main body, and a second extending portion positioned on an opposite end of the second main body, the second connecting portion and the first connecting portion are positioned on the different planes, and the second extending portion is located away from the second connecting portion and the first extending portion;
wherein the third pin comprises a third main body, a third connecting portion positioned on an end of the third main body, a third extending portion positioned on an opposite end of the third main body; and
wherein the fourth pin comprises a fourth main body, a fourth connecting portion positioned on an end of the fourth main body, a fourth extending portion positioned on an opposite end of the fourth main body, the fourth connecting portion and the third connecting portion is positioned on the different planes, the fourth extending portion is adjacent to the third extending portion.

18. The winding mechanism as claimed in claim 17, wherein the first main body is parallel to the second main body, and the third main body is parallel to the fourth main body.

19. The winding mechanism as claimed in claim 17, wherein a length of the first main body is same as that of the second main body, the third main body, and the fourth main body, a length of the first extending portion is same as that of the second extending portion, the third extending portion, and the fourth extending portion, and a length of the first connecting portion, the second connecting portion, the third connecting portion, and the fourth connecting portion is different.

* * * * *